US009379889B2

(12) United States Patent
Bernsen

(10) Patent No.: US 9,379,889 B2
(45) Date of Patent: Jun. 28, 2016

(54) SIMPLIFIED MANAGEMENT OF GROUP SECRETS BY GROUP MEMBERS

(71) Applicant: KONINKLIJKE PHILIPS N.V., Eindhoven (NL)

(72) Inventor: Johannes Arnoldus Cornelis Bernsen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 100 days.

(21) Appl. No.: 14/361,555

(22) PCT Filed: Nov. 30, 2012

(86) PCT No.: PCT/IB2012/056854
§ 371 (c)(1),
(2) Date: May 29, 2014

(87) PCT Pub. No.: WO2013/080168
PCT Pub. Date: Jun. 6, 2013

(65) Prior Publication Data
US 2014/0334624 A1    Nov. 13, 2014

Related U.S. Application Data

(60) Provisional application No. 61/565,530, filed on Dec. 1, 2011, provisional application No. 61/622,120, filed on Apr. 10, 2012.

(51) Int. Cl.
*H04L 9/08* (2006.01)

(52) U.S. Cl.
CPC .......... *H04L 9/0819* (2013.01); *H04L 9/0833* (2013.01); *H04L 9/0838* (2013.01); *H04L 9/0866* (2013.01); *H04L 9/0891* (2013.01); *H04L 2209/601* (2013.01); *H04L 2209/606* (2013.01)

(58) Field of Classification Search
CPC ....................................................... H04L 9/819
USPC .......................................................... 380/279
See application file for complete search history.

(56) References Cited

U.S. PATENT DOCUMENTS

2004/0096063 A1    5/2004  Carroni
2005/0111668 A1*   5/2005  Raikar ................. H04L 9/0833
                                                    380/278

FOREIGN PATENT DOCUMENTS

EP           0641103 A2      3/1995
JP         2002300149 A  *  10/2002
WO       WO2013042022 A1    3/2013

OTHER PUBLICATIONS

Kenthapadi, K., "Broadcast Encryption", The Stanford University InfoLab, Nov. 11, 2003.
Fiat, A. et al., "Broadcast Encryption", Aug. 22, 1993, Advances in Crypt0l0gy (CRYPTO). Santa Barbara, Aug. 22-26, 1993; [Proceedings of the Annual International Crypt0l0gy Conference (CRYPTO)], Berlin, Springer, DE, pp. 480-491, XP019194081.

* cited by examiner

*Primary Examiner* — Jacob Lipman
(74) *Attorney, Agent, or Firm* — Larry Liberchuk

(57) ABSTRACT

A method for key management is disclosed, wherein in adding a new device to a device group, the device group including a plurality of devices, wherein each device in the device group possesses device keys of all other devices in the device group for encryption of messages, except its own device key and wherein the device group includes a group manager device that possesses all device keys of the devices in the device group, the method includes, establishing a secure connection between the new device and the group manager device in the device group; sending, by the group manager device in the device group, the device keys of all devices in the device group to the new device; generating and distributing, a device key of the new device to all other devices in the device group. This approach is also generalized to k-resilient schemes.

14 Claims, 5 Drawing Sheets

SIMPLIFIED MANAGEMENT OF GROUP SECRETS BY GROUP MEMBERS

This application claims, pursuant to 35 U.S.C. 119, priority to and the benefit of, the earlier filing date of US provisional patent application entitled "Management of Group Secrets by Group Members," filed on Dec. 1, 2011 and afforded Ser. No. 61/565,530 and of U.S. provisional patent application entitled "Management of Group Secrets by Group Members," filed on Apr. 10, 2012 and afforded Ser. No. 61/622,120, the entire contents all of which are incorporated by reference, herein.

This application further claims, pursuant to 35 U.S.C. 371 priority to, and the benefit of the earlier filing date, of that patent application, filed under the aspercius of the Patent Cooperation Treaty, entitled "Management of Group Secrets by Group Members," on Sep. 14, 2012 and afforded serial number PCT/IB2012/054797, which claimed the benefit of the earlier filing date of U.S. Provisional patent application entitled "Management of Group Secrets by Group Members," filed on Sep. 20, 2011 and afforded Ser. No. 61/536,761 and of that patent application entitled "Management of Group Secrets by Group Members," filed on Sep. 14, 2012 and afforded serial number PCT/IB2012/054811, which claimed the benefit of the earlier filing date of US Provisional patent application entitled "Management of Group Secrets by Group Members," filed on Sep. 27, 2011 and afforded Ser. No. 61/539,723 and of US Provisional patent application entitled "Management of Group Secrets by Group Members," filed on Jan. 17, 2012 and afforded Ser. No. 61/587,269, the contents of all of which are incorporated by reference, herein.

This invention relates to the management of group secrets, and more particularly, to a method and a system for group members to manage group secrets.

Certain embodiments herein are directed to key management of a group of devices including starting a group, expanding group membership and reducing group membership, without a central authority that manages and distributes keys to the group members. Certain embodiments further allow a device of a group of devices to send secure messages to any sub-group of devices among the group members, wherein non-addressed devices cannot decrypt the message.

Message encryption schemes are known and may be based on, for example, 'Zero Message Broadcasting' (ZMB) or Broadcast Encryption'; see, e.g. Amos Fiat and Moni Naor, *Broadcast Encryption,* 1993 (hereinafter Fiat & Naor). Fiat & Naor discusses Broadcast Encryption. In general the term 'broadcast encryption' can simply mean encryption of broadcasts. However, as introduced by Fiat & Naor the term takes on a specific meaning. Fiat & Naor's 'broadcast encryption' was developed for enabling a broadcaster to securely broadcast a message to a subset of a pre-defined group of devices. The pre-defined group is called the device group.

The central idea in the simplest variant of Fiat & Naor's Broadcast Encryption is that each device in a device group possesses the device keys of all the other devices in the device group, except for its own device key. As shown in FIG. 1, table 100 lists the keys that each device possesses. For example, device 1 includes the device group key and device key 2 through device key N. Note that there exists key-management procedures for large groups, such that each device only has to be issued fewer keys than the group size minus one, e.g. $^2\log(\text{group size})$ keys and can compute from these keys all keys that are required.

When the broadcaster of a message wants to securely send a message to addresses of a subset of devices from the device group, the broadcaster puts the IDs of the addressed devices as a plaintext part of the message, computes an encryption key that is a function of all the device keys of the non-addressed devices. The device keys of the non-addressed devices are used since the addressed devices do not have their own keys. The broadcaster encrypts and broadcasts the message. Devices in the device group that are not addressed cannot decrypt the message, because they need their own key which they do not have. Devices outside the device group cannot decrypt the message because they do not have the keys of the non-addressed devices. Only addressed devices in the device group can decrypt the message. Of course devices belonging to the device group will have to know the algorithm to compute the message key from the device keys. In general, that algorithm does not have to be kept secret from others outside the device group.

A related concept is k-resiliency. In "Broadcast Encryption," Krishnaram Kenthapadi, Nov. 11, 2003, the author defines k-resiliency as follows:

In a system consisting of a set U of n users, a broadcast scheme is resilient to a set of users S if for every subset T that is disjoint from S, no eavesdropper that has all the secrets of S, can obtain "knowledge" about the secret common to T. This definition may either be considered information-theoretic or the computational definition of security. For example, a scheme is k-resilient if it is resilient to any set $S \subset U$ of size k.

Another way of defining k-resiliency is that a broadcast scheme is k-resilient if at least k+1 members have to collude or work together in order to obtain all group secrets. Such an attack of combining the knowledge by a group is called a collusion attack.

The scheme described above is 1-resilient. That is simple to see with the above definition, since any group member can learn the secret it is missing, its own key, from any other group member.

Examples of existing k-resilient broadcast encryption schemes may be found in Amos Fiat and Moni Naor, *Broadcast Encryption,* 1993 and Krishnaram Kenthapadi, *Broadcast Encryption*, Nov. 11, 2003.

When adding a member to a device group, all old members usually are issued new group keys or perform a one-way function on the old group keys and the new member is issued the new keys. Note that a one-way function is a mathematical function that is easy to compute for every input, but for which the inverse function is very hard to compute. By doing so, the new member cannot decrypt old messages sent to the group.

Sending a Message to all Devices in a Device Group

If a broadcaster outside the device group desires to broadcast a message to all devices in the device group, it has a problem with the simple scheme above, because there is no unaddressed device, so the broadcaster does not have a key to use. A solution here is to use a special device group key that all devices know. One could say that this device group key is the device key of a device that does not exist. Similar solutions exist for k-resilient schemes.

If a member of a device group wants to send a message to all other devices in the device group, it has the same problem. Therefore, in addition to the device keys of all other devices in the device group, each device also gets a device group key. Thus, to send a message to all members of the device group, the broadcaster would use the device group key.

A problem with broadcast encryption schemes is that they rely on a central authority to distribute the keys required by each device and manage membership of the group.

US provisional Patent Application, No. 61/536,761, discloses a system where such a central authority is not required, and the group devices themselves can manage device group set-up and management, and further manage the keys required by each device. According to such a system, adding a new device to a device group in a k-resilient scheme sets up a secure connection between the new device and k+1 devices of the device group. Note that the smallest allowed value for k is 1, such that the user makes connections between the new device and at least 2 other devices. If near field communication (NFC) is used for the secure connection, this involves 'touching' one of the devices in the device group with the new device and then touching at least one other one. Note that NFC is a set of short-range wireless technologies, typically requiring a distance of 4 cm or less to initiate a connection. Since the distances involved are so short, the devices almost touch or actually touch each other when the communication channel is established. Therefore, in NFC, 'touching' means the devices are actually touching or getting very close to each other.

In the above-mentioned US provisional Patent Applications, all devices in the device group are equal with respect to the group secret management. All devices in the device group can send messages to any subset of devices of the device group, such that only addressed devices can decrypt that message. All devices can be removed from the device group using the group secret management. Removing a device from the device group involves distributing new group secrets to the remaining devices in the device group, without the device to be removed being able to learn the new group secrets. This is done by encrypting the messages with the new device group secrets with keys that the device to be removed does not have. The device to be removed does not have its own key in a 1-resilient scheme, or does not have the keys that belong to subsets of the device group, of which subsets the device is a member of in a k-resilient scheme.

According to an embodiment of the present invention, one of the device group members is elected as the group manager device. This is preferably the device that started the device group, but it may be any member of the device group. The group manager device is allowed to know everything that goes on in the device group, such that no messages are hidden from the group manager device. In particular, the messages to remove a device are not hidden from the group manager device. This means that the group manager device is allowed to know all group secrets and, when adding a new device to the device group, a secure connection is only utilized between the device to be added and the group manager device. The group manager device can now create and distribute all new group secrets. Thus, in a k-resilient scheme, no secure connections are needed to k other devices to create the new device group secrets that would otherwise have to be hidden from the device that is adding the new. Another advantage in certain embodiments is that the device key of the group manager device can be used as a device group key, which key can be used by all members of the device group to encrypt messages that can be read by all members of the device group, so no separate device group key has to be created and distributed. In certain embodiments where a device is to be removed from the device group another advantage is that the group manager device can handle all new key generation and distribution, so no coordination is required between the devices in the device group for new key generation and distribution.

In another embodiment, a method of adding a new device to a device group is described. The device group including a plurality of devices, wherein each device in the device group possesses device keys of all other devices in the device group for encryption of messages, except its own device key and wherein the device group includes a group manager device that possesses all device keys of the devices in the device group, including its own device key. The method including: establishing a secure connection between the new device and the group manager device; sending, by the group manager device, the device keys of all devices in the device group to the new device; generating, by one of the devices in the device group, a device key of the new device and distributing it to all other devices in the device group.

In another embodiment, a method of removing a device from a device group is described. The device group including a plurality of devices, wherein each device in the device group possesses device keys of all other devices in the device group for encryption of messages, except its own device key and wherein the device group includes a group manager device that possesses all device keys of the devices in the device group, including its own device key. The method including: generating and distributing, by any combination of devices remaining in the device group, new device keys for the devices remaining in the device group, such that each of the devices other than the group manager device does not generate its own new device key and does not receive its own new device key.

In another embodiment, a method of managing the membership of a device group is described. The device group comprises n (n>1) devices, wherein the device group comprises a group manager device that possesses all keys in the device group, and wherein each device in the device group possesses key material with which it can encrypt messages to the whole device group or to any subset of the device group, such that only addressed devices and the group manager device can decrypt the messages under a k-resilient scheme (k>1). The method including: (a) in case of adding a new device to the device group: generating, by the group manager device, for all subsets of the device group that have at most k−1 members, extended with the new device, thus for subsets of at most k member devices, new key material per subset to encrypt messages that can be decrypted by all devices except the devices in the subset of the device group and except the new device, and distributing the key material per subset to all devices in the device group that are not part of the subset of the device group; establishing a secure connection between the new device and the group manager device; and sending, by the group manager device, the key material to the new device; and (b) in case of removing a device from the device group: generating, by the group manager device, for all subsets of the device group that have at most k members and that do not include the device to be removed from the device group, new key material per subset to encrypt messages that can be decrypted by all devices except devices in said subset of the device group, and distributing said key material per subset to all devices in the device group that are not part of the subset of the device group.

In one embodiment, the group manager device proves to another device group member that it is the group manager device by encrypting a message with all keys that the other device group member possesses. The fact that this is proof of being the group manager device is because one of the keys that ordinary devices would have to use for this proof is their own device key, which they do not possess. The situation where the group manager device desires to prove to another device group member that it is the group manager device may arise, for example, when the group manager device wants to transfer the group manager role to another device. The one giving up the role can prove its group manager role to the new group manager device before the transfer, and the new group manager device can prove its group manager role to the members after the transfer.

In general the various aspects of the invention may be combined and coupled in any way possible within the scope of the invention. The subject matter that is regarded as the invention is particularly pointed out and distinctly claimed in the claims at the conclusion of the specification. The foregoing and other features and advantages of the invention are apparent from the following detailed description taken in conjunction with the accompanying drawings.

Figure 8:
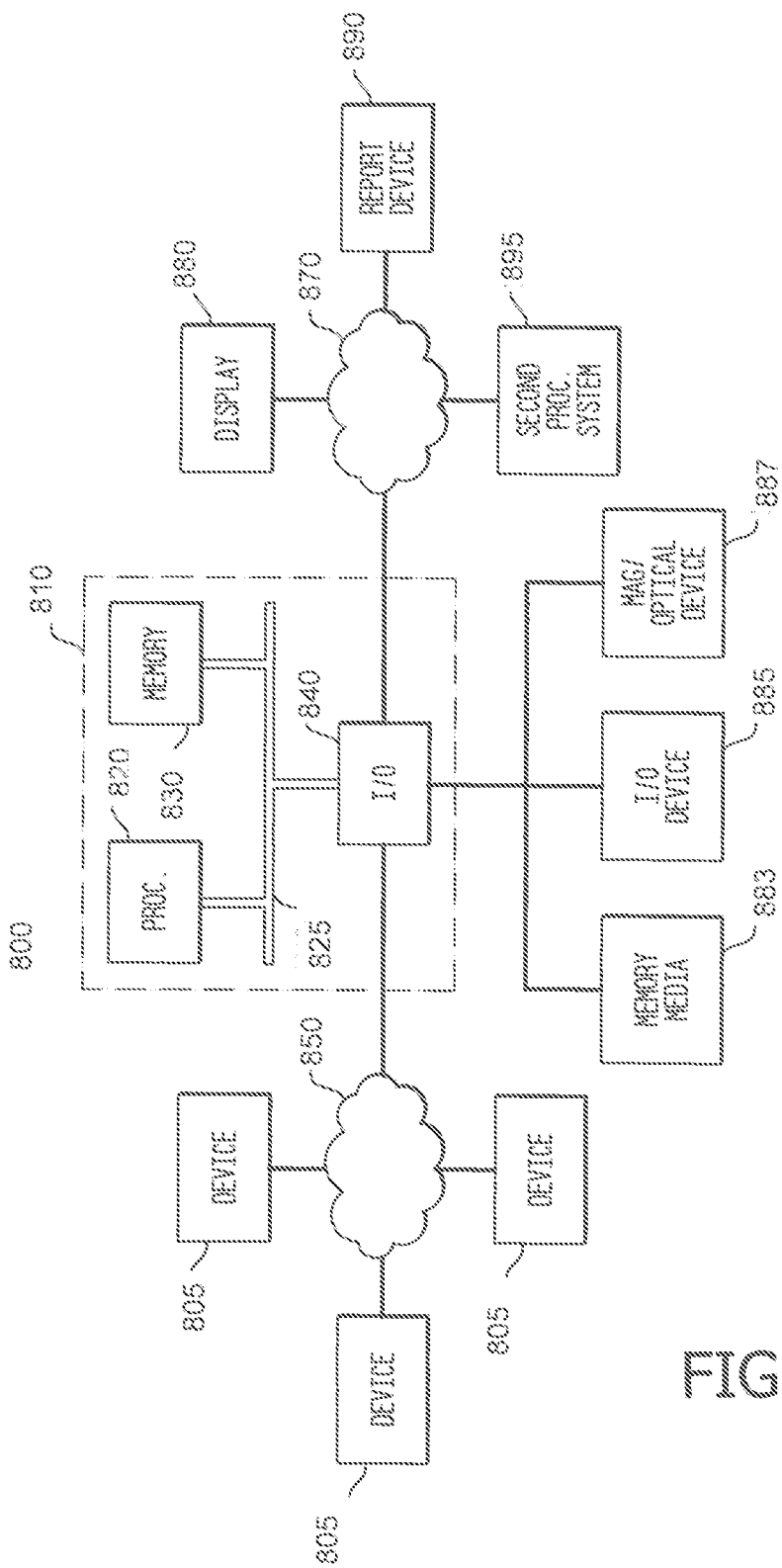

FIG. 8 shows an exemplary system configuration for device key management in accordance with the principles of the invention. It is to be understood that the figures and descriptions of the present invention described herein have been simplified to illustrate the elements that are relevant for a clear understanding of the present invention, while eliminating, for purposes of clarity, many other elements. However, because these elements are well-known in the art, and/or because they do not facilitate a better understanding of the present invention, a discussion of such elements is not provided herein. The disclosure herein is directed to also variations and modifications known to those skilled in the art.

In an embodiment of the invention, only one secure connection is set-up when adding a device to a device group. Setting up a secure connection may be done using NFC, which involves 'touching' one device with the other. In this embodiment, one device 'touches' only one other device instead of two or more other devices. Such single action is more convenient and intuitive for the user. Note that removing a device from a device group does not require a secure connection.

According to one embodiment of the invention, at least one of the devices in a device group is a group manager device. This group manager device can generate, manipulate and exchange all group secrets. Therefore, devices can be added to a device group in case there is no external party generating and distributing keys.

Examples shown herein are for a 1-resilient scheme and for a k-resilient scheme. However, embodiments are not so limited.

The following description of an embodiment of the invention is for a 1-resilient scheme.

1. Establishment of Device Keys and a Device Group Key when Adding a Device to a Device group.

Figures 1, 2:
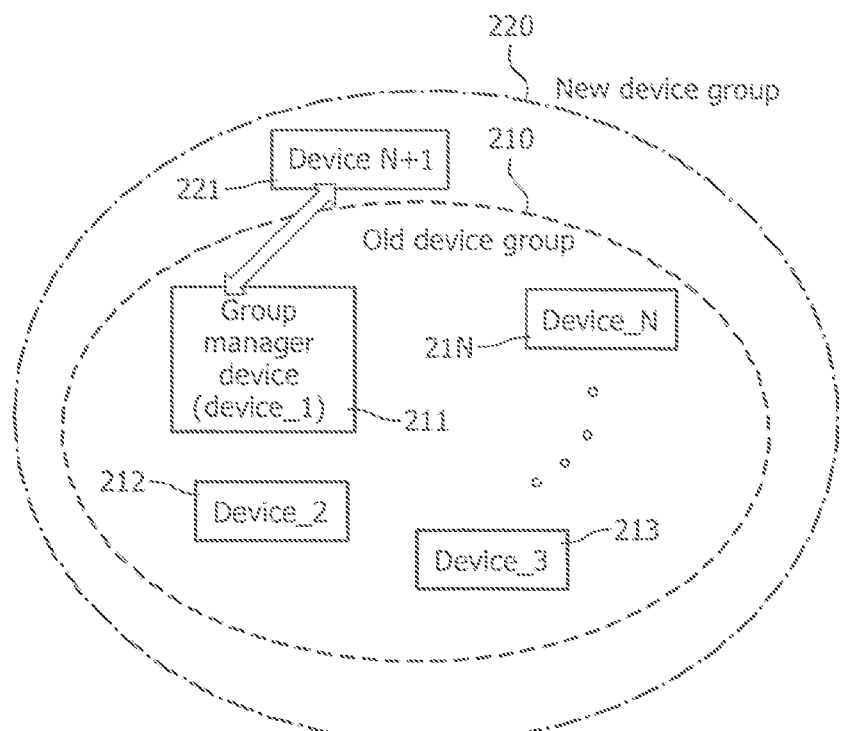
FIG. 1 shows a table with device keys that each device in the device group possesses.
FIG. 2 shows an illustration of a new device group that is formed after a new device joins a device group.

Referring to FIG. 2, a device group 210 includes member devices: a group manager device 211, Device_2 212, Device_3 213 . . . Device_N 21N. When a new device Device_N+1 221 joins the device group, a new device group 220 is formed. For clarity, the original group of N devices is labeled the old device group 210 and the expanded group is labeled the new device group 220. It is understood that each device in the device group includes at least a network interface for communicating with other devices, and a processing unit having hardware and software components for performing encryption, decryption of messages and processing as outlined below.

As shown in FIG. 2, there are multiple devices: the group manager device 211, Device_2 212, Device_3 213 . . . Device_N 21N in the old device group 210. For this general case of a device group of size N>1, the group manager device 211 possesses all device keys, and each of the 1 . . . N−1 other devices possesses the device keys of the other N−1 devices, but not its own device key, as, for example, shown in table 100 of FIG. 1.

However, a special case occurs when the old device group 210 consists of only 1 device, as compared to the starting case where the old device group 210 consists of more than 1 device shown in FIG. 2.

For the special case of N=1, i.e., the old device group 210 consists of one device (group manager device=Device_1), the group manager device 211 does not have a real need for its own device key. Prior to the new device Device_N+1 221 joining the group, the single device, acting as the group manager device generates a random device key for itself.

Following the generation of the random device key of the group manager device 211, the procedures for adding device Device_N+1 221 to the group are similar to the general case of N>1. Therefore, the discussion continues with reference to FIG. 3.

Figure 3:
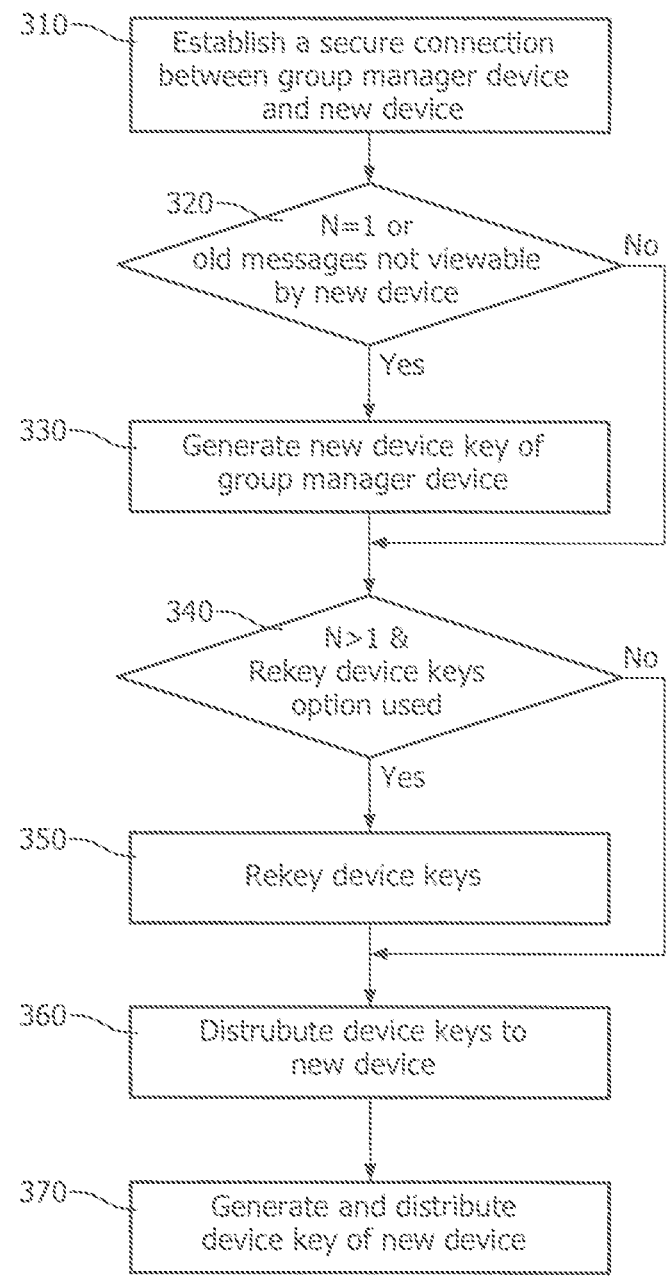
FIG. 3 shows a flow chart of device key management when a device joins a device group.

FIG. 3 shows the process flow of adding a new device to the device group for both the general case of N>1 and the special case of N=1. While blocks appear in a particular order, it is not a requirement to perform steps in the particular order shown.

This embodiment has 2 options as shown in FIG. 3:
generate a new device key of the group manager device 211 in 330, and
generate new device keys in 350.

If the special case applies where N=1, then a new device key of the group manager device 211 is generated as pointed out above. Where N>1, if it is a requirement that the new device (Device_N+1) 221 is not able to decrypt messages previously exchanged between members of the old device group 210, the new device (Device_N+1) 221 does not learn the old keys, so the keys are generated anew, and both options should be used.

If at least one of these options is used, the distribution of the device key of the new device (Device_N+1) 221 does not require the setting-up of extra secure channels.

In 310, a secure connection between the group manager device 211 and the new device Device_N+1 221 is established. The secure connection may be, for example, a secure pairing using Near Field Communication (NFC), using a secure simple pairing of Bluetooth, or Wi-Fi Protected Setup of a Wi-Fi ad-hoc or Wi-Fi Direct connection, or any other appropriate secure pairing. In one embodiment the new device_N+1 221 is 'securely paired' with the group manager device 211 from the old device group 210, where 'securely paired' means here that the connected devices are authenticated as paired and no other device can decrypt the messages being exchanged between the paired devices.

In 320, if N=1, the special case, or if it is a requirement that the new device (Device_N+1) 221 is not able to decrypt messages previously exchanged between members of the old device group 210, then move to 330 and generate a new device key of the group manager device 211.

As mentioned above for the special case where N=1, i.e. the old device group 210 consists of one device, the single device generates, preferably, a random device key of the group manager device 211.

For N>1, in order to generate the new device key of the group manager device 211, these devices: group manager device 211, Device_2 212, Device_3 213, . . . , Device_N 21N use a one-way function on the old device key of the group manager device 211. The particular one-way function should be known, but does not have to be a secret. Note that not creating a new device key of the group manager device 211 would mean that the new device 221 can subsequently decrypt the messages by which its device key is distributed to Device_2 212, Device_3 213 . . . Device_N 21N in step 360, if that message was encrypted with the old device key of the group manager device 211.

At 340, if N>1 and it is a requirement that the new device (Device_N+1) 221 is not able to decrypt messages previously exchanged between members of the old device group 210, then move to 350 and generate new device keys. In other words, the devices of the old device group 210 are re-keyed.

At 350, group manager device 211, Device_2 212, Device_3 213 . . . Device_N 21N perform a re-keying action of the device keys of devices Device_2 212, Device_3 213 . . . Device_N 21N they possess. The re-keying action can use the same one-way function as the one used in 330, or a different method. The process at 350 is optional, for example, whether or not there is a requirement that the new device (Device_N+1) 221 is unable to decrypt messages previously exchanged between members of the old device group 210.

In 360, keys are distributed to the new device. The group manager device 211 sends the device key of the group manager device 211 to the new device 221 over the secure channel. This is performed for both N=1 and N>1.

For N>1, the group manager device 211 sends the IDs and (possibly re-keyed) device keys of Device_2 212, Device_3 213 . . . Device_N 21N over the secure channel to the new device 221. This is not required for N=1.

In 370, the device key of the new device 221 is generated and distributed.

Any one of the devices in the old device group can perform this function. Without loss of generality, assuming that the group manager device 211 performs this step, the group manager device 211 generates a random number that is going to be the device key of the new device 221. The group manager device 211 sends information on the new device 221 (e.g. ID, name, etc.) together with the device key of the new device to all members of the old device group 210 (not required for N=1). This means that all devices of the new device group 220, except the new device 221 itself, possess the key of the new device 221.

To transmit this information the group manager device 211 preferably encrypts the information in order that new device 221 does not learn its own key. In one embodiment the key that the group manager device 211 uses for the encryption of this transmission is the old device key of the group manager device 211. In this case, a new device key of the group manager device 211 has to be generated in 330. If the device keys of devices Device_2 212, Device_3 213 . . . Device_N 21N are re-keyed in 350 of FIG. 3, the device keys of the old device group 210 can also be used for the encryption of this transmission. In the latter case, the transmission is sent to at least two sub-groups of the old device group 210, because it does not have a key that all other devices Device_2 212, Device_3 213 . . . Device_N 21N do have, and the new device 211 does not have.

If the optional acts described in 330 and 350 are not taken, such that none of the device keys are generated anew, the group manager device 211 sets up other secure ways to communicate the device key of the new device (Device_N+1) 221 to the other devices in the old device group 210, in order to keep the new device 221 from learning its own device key.

Note that in 330 and 350 as described above, in one embodiment the re-keying uses a one-way function. This has an advantage that the new keys do not have to be distributed. However, it is also possible that the new device keys are generated randomly and distributed securely to the devices of the old device group 210 using the old device keys. A similar way to generate new device keys randomly and to distribute them securely to the devices of the old device group 210 is used below in 520 and 530.

Figure 4:
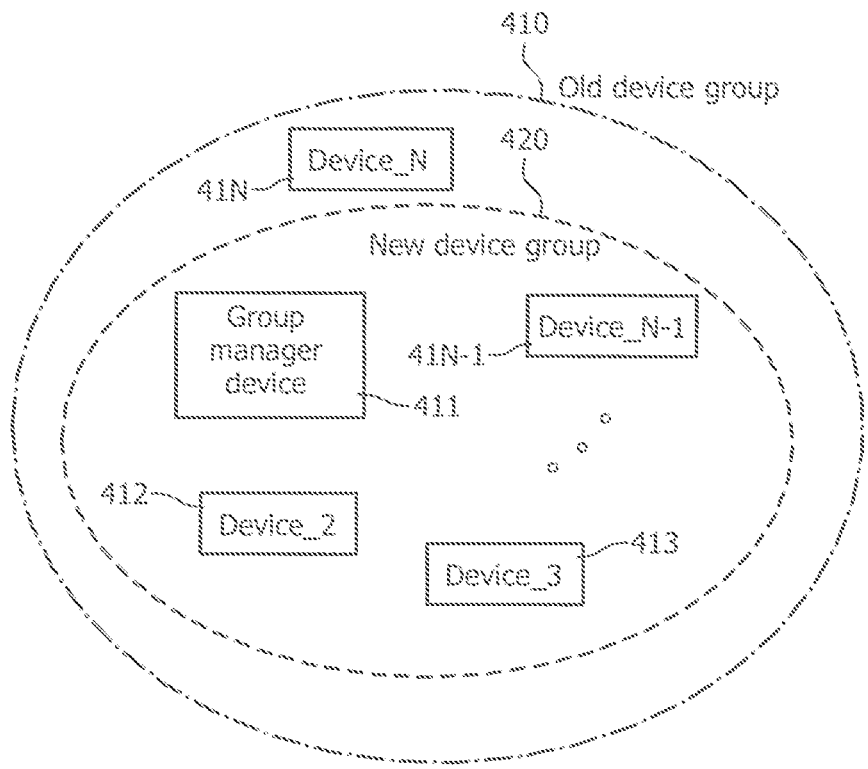
FIG. 4 shows an illustration of a new device group that is formed after a device leaves a device group.

2. Establishment of Device Keys and Device Group Key when Removing a Device from a Device Group Referring to FIG. 4, a device group 410 of N devices (group manager device 411, Device_2 412, Device_3 413 . . . Device_N 41N) with N>1 is shown, where Device_N is to be removed from the old device group. The devices remaining in the old device group 410 form a new device group 420. Examples of why a device is to be removed include a device that is broken, has been sold or given away, etc.

Figure 5:
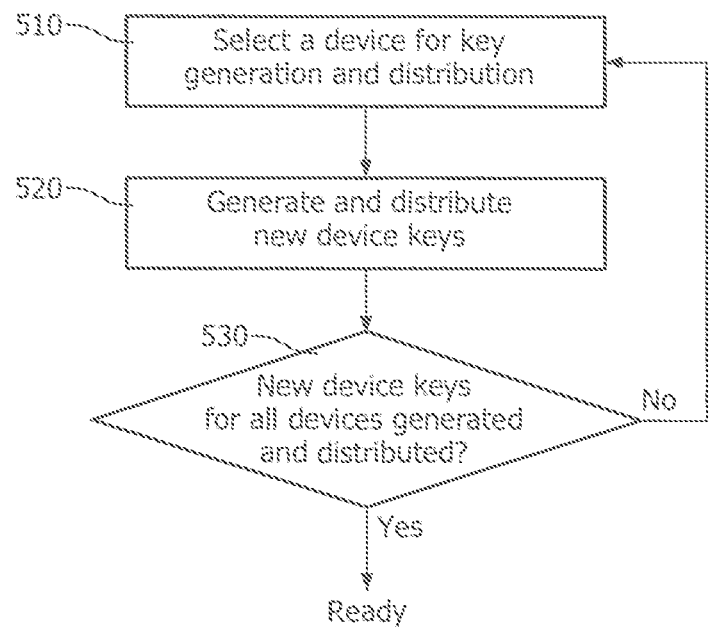
FIG. 5 shows a flow chart of device key management when a device leaves a device group.

FIG. 5 shows the high level process flow of removing a device from the old device group 410. While blocks appear in a particular order, it is not a requirement to perform steps in the particular order shown.

This process can be carried out by just the group manager device 411, or any combination of 2 or more devices: the group manager device 411, Device_2 412 . . . Device_N−1 41N−1. In one example it is the simplest however if the group manager device 411 carries this process out, because this only requires step 510.

In 510, a key generation device is selected from the devices remaining in the device group: the group manager device 411, Device_2 412 . . . Device_N−1 N−1.

In 520, this selected device generates new device keys for any or all of the remaining devices: the group manager device 411, Device_2 412 . . . Device_N−1 41N−1 for which no new device keys have been generated already and distributes the device keys it generated. Note that devices other than the group manager device 411 cannot generate a Device key for themselves.

The new device keys are generated randomly. Note that the new keys should not be generated using the known one-way function, because the Device_N 41N to be removed could also generate the new device keys the same way. The selected device sends the new device keys it generated to the remaining devices in the new device group 420, in such a way that each of these devices does not receive its own new device key. The new device keys are encrypted prior to sending by using the device key of the to-be-removed Device_N 41N, because this device does not have its own key.

In 530, it is determined whether or not new device key for all devices have been generated and distributed. If all device keys have been generated and distributed, the process is finished. If not, the process continues at 510.

An alternative approach to generating and distributing new keys is to base all future communication on at least the key of the device to be removed. Thus, the key for future communication would include at least the key of any device to be removed. Alternatively, only the last removed device can be utilized. One skilled in the art can recognize variations in generating the keys based on removed devices.

In the above embodiments, the devices create keys for encryption of messages. However, the same methods can be used for generating the keys for authenticating messages. The same method can also be used for the generation of so-called key material from which encryption keys and/or authentication or other keys are derived.

3. Establishment of Device Keys and a Device Group Key when Removing the Group Manager Device from a Device Group With the procedure as described hereinabove, an ordinary device can be removed from a device group in a secure manner, such that the device to be removed cannot decrypt messages that are exchanged between devices in the new device group 420 and that are encrypted with the new device keys as generated in the procedure above.

However, there may be reasons to remove the group manager device from a device group. For example, this device may have broken down or been sold or been given away.

In all cases, a new group manager device has to be elected from the remaining devices in the new device group 420.

The above-described procedure for removing a device from a group may be followed with the newly elected group manager device to exclude the old group manager device. However, following the above-described procedure would allow the old group manager device to continue to decrypt the messages exchanged in the new device group 420. This may be acceptable if for example, the old group manager device has broken down or there is no risk that the old group manager device will decrypt messages exchanged between devices in the new device group 420.

However, to keep the old group manager device from decrypting messages exchanged between devices in the new device group 420, an adapted procedure can be followed where the distribution of new device keys is protected in other secure ways, e.g. by setting up secure connections between the devices in the new device group 420.

4. Proving to be the Group Manager Device of a Device Group

The following procedure provides an example of the group manager device (211) of a device group (210) proving to any of the other devices (212, 213, . . . , 21N) in the device group (210) that it is the group manager device. Without loss of generality assuming that the group manager device (211) wants to prove to another device, for example device Device_3 (213), that it is the group manager device, the group manager device (211) encrypts a message using the device keys from all non-group manager devices (212, 212, 213, . . . , 21N) in the device group (210) that the other device, Device_3 213), possesses, using Key 2, Key 4, Key 5, . . . , and Key N from table 100 in FIG. 1, and sends this message to the other device Device_3 (213). None of the other devices can do this. For example, device_2 (212) does not possess its own device key, Key 2. It is of course possible for the group manager device (211), in addition to the mentioned keys, to use any other key that the other device Device_3 (213) possesses.

K-Resiliency

The approach described in the above embodiments may also be applied for k-resilient schemes. For a k-resilient scheme, adding a member involves setting up a secure connection with the group manager device. In setting up the secure connection and communicating, the group manager device ensures that it is communicating with the new device and not with a device that is already a member of the group, because then that member of the group would have access to all secrets of the group. Thus, in a preferred embodiment device authentication is included.

When removing a member, just the group manager device 411 or any combination of devices generate new device keys and send them to the other devices in the new device group 420 using for example the proper device keys of the old device group 410. Note that if the group manager device 411 is not used when removing a member, at least k+1 devices have to generate and distribute new device keys for the new device group 420. Note further that if the group manager device 411 has to be removed from the device group, a new group manager device has to be elected and if the new key material is to be kept secret from the old group manager device 411, secure channels are used between the members of the new device group 420 for the distribution of the new key material.

The scheme of this embodiment is not fully k-resilient for k>1. This is because the group manager device possesses all key material and a collusion attack of any one ordinary device in the device group with the group manager device results in the ordinary device knowing all key material of the device group. The scheme of this embodiment is fully k-resilient against collusions of up to k ordinary members of a device group.

Figure 6:
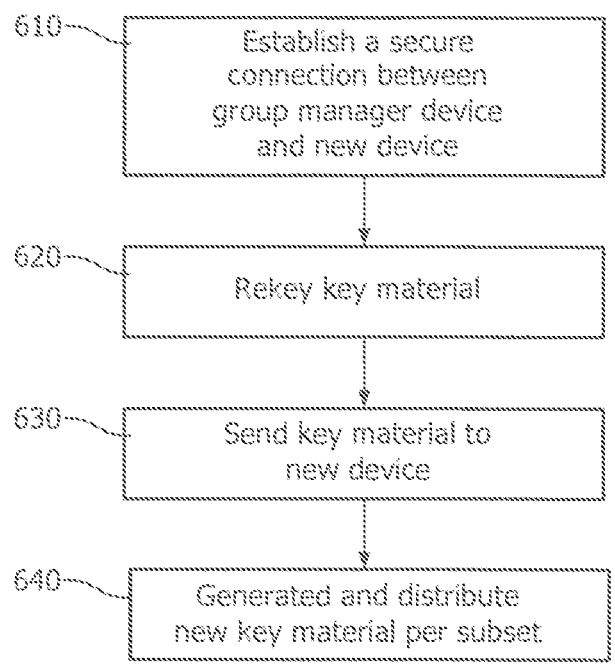
FIG. 6 shows a flow chart of device key management when a device joins a device group under a k-resilient scheme.

FIG. 6 shows a high level process flow of adding a device to a device group under a k-resilient scheme. Under such a scheme, each device in the device group possesses key material with which it can encrypt messages to the whole device group or to any subset of the device group, such that only addressed devices can decrypt the messages. The only exception to this is the group manager device, which is entitled to know all key material of the whole device group.

Note that it is not required to create key material for subsets of more than one device that do include the group manager device.

In this case, subsets in the device group that have at most k−1 members are extended with the new device to extended subsets of at most k member devices.

In 610, a secure connection is established between the group manager device 211 and the new device 221.

In 620, each device in the device group re-keys the key material with a one-way function. The group manager device 211 possesses all re-keyed key material. The other devices in the old device group 210 possess only the key material that they are allowed to have.

In 630, the group manager device 211 sends the re-keyed key material to the new device via the secure connection.

In 640, the group manager device 211 creates random key material for all subsets of devices of the old device group 210 that have at most k−1 members extended with the new device 221, so for subsets of at most k member devices, to encrypt messages that can be decrypted by all devices except the devices in the subset of the device group and except the new device. The group manager device 211 distributes the key material per subset to all devices in the device group that are not part of the subset. The group manager device 211 encrypts the messages to distribute the new key material using the old key material, such that the other devices cannot decrypt messages with keys that they are not allowed to possess.

Figure 7:
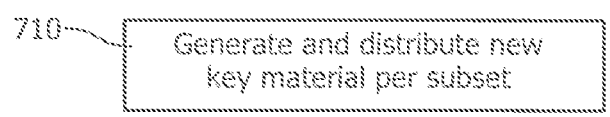
FIG. 7 shows a flow chart of device key management when a device leaves a device group under a k-resilient scheme.

When removing a device from the device group under a k-resilient scheme, the group manager device 411 generates—for all subsets of the device group that have at most k members and that do not include the device to be removed from the device group—new key material per subset to encrypt messages that cannot be decrypted by all devices in the subset of the device group and distribute the key material per subset to all devices in the device group that are not part of the subset of the device group. FIG. 7 shows the step 710 to remove a device. As an alternative, the key material for all subsets that have at most k members and that do not include the device to be removed from the device group can be generated by combinations of devices of the new device group 420, such that ordinary devices cannot generate key material for subsets to which they belong. The new key material is distributed using the key material of the old device group 410, such that devices do not learn key material that they are not allowed to possess.

Note that it is not required to create key material for subsets of more than one device that do include the group manager device 411.

The k-resilient scheme is further clarified for the special case of k=2 and when a fifth device is added and later removed from a group of 4 devices. A 2-resilient scheme means that the information of any single non-addressed device, as well as the combined information of any two non-addressed devices, is sufficient to compute the key that is used to encrypt messages to the addressed devices.

Adding a Device (k=2)

In the starting condition, there are 4 devices D1, D2, D3 and D4. Each of the devices D2, D3 and D4 has keys for all subsets of 1 and 2 devices of which subset it is not a member. Note that it is not required to create key material for subsets of more than 1 device that do include the group manager device D1. The group manager device D1 possesses all keys. See Table 1 for the keys each device has.

TABLE 1

| Device | Keys known to the device |
|---|---|
| Group Manager Device D1 | K1, K2, K3, K4, K23, K24, K34 |
| D2 | K1, K3, K4, K34 |
| D3 | K1, K2, K4, K24 |
| D4 | K1, K2, K3, K23 |

In Table 1, K2 is the key for the subset consisting of only device D2, and K23 is the key for the subset consisting of devices D2 and D3, etc.

When addressing a message to a subset, the key to be used is a function of the keys of all the subsets of size 1 and 2 that are not addressed. For example, when only device D1 is addressed by device D4, the key to be used is a function of K23, the key that both D2 and D3 do not have and keys K2 and K3. In case there is only one device not addressed, the key to be used is the key of the non-addressed device.

When a device D5 is added, the following steps are taken. To further aid the understanding of this process, flow diagram in FIG. 6 is followed with the special case where k=2.

In 610, a secure connection is established between D5 and the group manager device D1.

In 620, each device in the device group re-keys the key material with a one-way function. The re-keyed keys are denoted here with an apostrophe (').

In 630, group manager device D1 sends the re-keyed material it has, i.e. K1', K2', K3', K4', K12' K13', K14', K23', K24', K34' to the new device D5.

Table 2 shows the keys that all devices contain at this point of the device addition procedure.

TABLE 2

| Device | Keys known to the device |
|---|---|
| Group Manager Device D1 | K1, K2, K3, K4, K23, K24, K34<br>K1', K2', K3', K4', K23', K24', K34' |
| D2 | K1, K3, K4, K34<br>K1', K3', K4', K34' |
| D3 | K1, K2, K4, K24<br>K1', K2', K4', K24' |
| D4 | K1, K2, K3, K23<br>K1', K2', K3', K23' |
| D5 | K1', K2', K3', K4', K23', K24', K34' |

In 640, group manager device D1 in the device group, generates for all subsets in the new device group that have at most 2 members and that do not include the new device D5, new key material per subset to encrypt messages that can be decrypted by all devices except the devices in the subset of the device group and except the new device, and distribute the key material per subset to all devices in the device group that are not part of the subset of the device group.

This means that D1 generates K5', K25', K35' and K45'. Note that it is not required to create key material for subsets of more than 1 device that do include the group manager device D1.

Device D1 distributes K5' to D2, D3 and D4, using the old device key K1 that the new device D5 does not know.

Device D1 distributes K25' to D3 and D4, using the old device key K2, so both D2 and the new device D5 are unable to learn K25'. Keys K35' and K45' are similarly distributed by device D1.

It is also possible for device D1 to send to each device separately the new keys it needs using the appropriate encryption keys, e.g., D1 could send device D2 the keys K5', K35' and K45' using key K34 as an encryption key. Devices D3, D4 and D5 do not have this key. In a similar way, the new keys for D3 and D4 can be distributed by D1.

Table 3 shows the keys that all devices contain at the end of the device addition procedure.

TABLE 3

| Device | Keys known to the device |
|---|---|
| Group Manager Device D1 | K1, K2, K3, K4, K23, K24, K34<br>K1', K2', K3', K4', K23', K24', K34'<br>K5', K25', K35', K45' |
| D2 | K1, K3, K4, K34<br>K1', K3', K4', K5', K34', K35', K45' |
| D3 | K1, K2, K4, K24<br>K1', K2', K4', K5' K24', K25', K45' |
| D4 | K1, K2, K3, K23<br>K1', K2', K3', K5', K23', K25', K35' |
| D5 | K1', K2', K3', K4', K23', K24', K34' |

Removing a Device (k=2)

Removing a device is shown in the special case of a 2-resilient scheme. The starting situation is the (expanded) group of 5 devices from the previous example. When removing a device from the device group under a 2-resilient scheme, 2+1=3 of the remaining devices in the device group generate, for all subsets of the device group that have at most 2 members and that do not include the generating device itself, nor the device to be removed from the device group, new key material per subset to encrypt messages that cannot be decrypted by all devices in the subset of the device group and distribute the key material per subset to all devices in the device group that are not part of the subset of the device group. However, it is also possible that the group manager device 411 creates all new key material. In this example, D5 is the device to be removed. Without loss of generality, it is assumed here that the group manager device D1 performs the device removal step 710.

D1 generates keys K1", K2", K3", K4", K23", K24", and K34".

Device D1 distributes K1", K3", K4", and K34" to D2 using a key that is a function of keys K34', K35' and K45' and optionally also K3', K4' and K5', so devices D3, D4 and D5 are not able to learn these new keys.

Device D1 distributes K1", K2", K4", and K24" to D3 using a key that is a function of keys K24', K25' and K45' and optionally also K2', K4' and K5', so devices D2, D4 and D5 are unable to learn these new keys.

Device D1 distributes K1", K2", K3", and K23" to D4 using a key that is a function of keys K23', K25' and K35' and optionally also K2', K3' and K5', so devices D2, D3 and D5 are unable to learn these new keys.

Table 4 shows the keys that all devices contain at the end of the device removal procedure. For clarity, the initial keys, i.e., the ones without an apostrophe (') or right quotation (") have been removed from this table.

TABLE 4

| Device | Keys known to the device |
| --- | --- |
| Group Manager Device D1 | K1', K2', K3', K4', K5', K23', K24', K25', K34', K35', K45 K1", K2", K3", K4", K23", K24", K34" |
| D2 | K1', K3', K4', K5', K34', K35', K45' K1", K3", K4", K34" |
| D3 | K1', K2', K4', K5' K24', K25', K45' K1", K2", K4", K24" |
| D4 | K1', K2', K3', K5', K23', K25', K35' K1", K2", K3", K23" |
| D5 | K1', K2', K3', K4', K23', K24', K34' |

One of the alternative ways for the generation of the new key material is:
- D2 generates K1", K3", K4", K34";
- D2 distributes K1" to D1, D3 and D4 using K5';
- D2 distributes K3" to D1 and D4 using K35', K3' and K5';
- D2 distributes K4" to D1 and D3 using K45', K4' and K5';
- D2 distributes K34" to D1, using keys K34', K35' and K45' and in addition possibly also K3', K4', K5';
- D3 generates K2" and K24;
- D3 distributes K2" to D1, and D4 using K25', K2' and K5';
- D3 distributes K24" to D1, using keys K24', K25' and K45' and in addition possibly also K2', K4', K5';
- D4 generates K23" and distributes K23" to D1, using keys K23', K25' and K35' and in addition possibly also K2', K3', K5';

Proving to be the Group Manager Device of a Device Group (k=-2)

If the group manager device D1 of a device group, see Table 3 above, wants to prove to any of the other devices D2 -D5 in the device group of Table 3 above that it is the group manager device, the following procedure may be followed. Without loss of generality assuming that the group manager device D1 wants to prove to another device, for example device D3 in table 3 above, the group manager device D1 encrypts a message using the key material, from all non-group manager devices D2 -D5 in the device group of table 3 above that the other device D3 possesses, so using K2', K3', K4', K5', K23', K24', K34', K25', K35', and K45' from table 3 above and sends this message to the other device D3 . None of the other devices can do this. For example, D2 does not possess K2', K23', K24', and K25'. The device key K1' of the group manager device does not have to be used, since all devices in the device group knw this key. It is of course possible for the group manager device, in addition to the mentioned keys, to use any other key that the other device D3 possesses. It is also possible for the group manager device to use less keys, e.g. K2', K3', K4' and K5', but then the 2-resiliency property is lost. For instance, in the latter case, D2 needs to obtain the key it misses (K2') only from one other device (D4 e.g.) in order to falsify the message that would prove it to be the group manager device. In case the message was encrypted using K2', K3', K4', K5', K23', K24', K34', K25', K35', and K45' from Table 3 above, the scheme is 2-resilient, because D2 obtains the keys it misses (K2', K23', K24', and K25') from at least two other devices, e.g. D4 and D5.

As can be seen in the above examples, the number of keys required for k-resilient schemes grows quickly with k and the total number of devices. There are ways to reduce the number of keys, (see, for example, Amos Fiat and Moni Naor, *Broadcast Encryption,* 1993), and these ways may be combined with the present invention to simplify the implementation of some embodiments.

This invention is applicable to devices, such as TVs, PC monitors, (digital, home) audio systems, access points, dedicated wireless docking stations, PCs, and the like.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

FIG. 8 illustrates an exemplary system configuration 800 for implementing the principles of the invention as depicted in the exemplary processing shown herein. In this exemplary system configuration 800, communication data is received from devices 805 over network 850 and is processed in accordance with one or more programs, either software or firmware, executed by device 810. The results of device 810 may then be transmitted over network 870 for viewing on display 880, reporting device 890 and/or a second processing system 895.

Device 810 includes one or more input/output devices 840 that receive/transmit (i.e., a transceiver) data from the illustrated devices 805 over network 850. The received data is then applied to processor 820, which is in communication with input/output device 840 and memory 830. Input/output devices 840, processor 820 and memory 830 may communicate over a communication medium 825. Communication medium 825 may represent a communication network, e.g., ISA, PCI, PCMCIA bus, one or more internal connections of a circuit, circuit card or other device, as well as portions and combinations of these and other communication media.

Device 810 and/or processor 820 may be representative of a handheld calculator, special purpose or general purpose processing system, desktop computer, laptop computer, palm computer, a mobile communication device, personal digital assistant (PDA) device, a tablet computer etc., as well as portions or combinations of these and other devices that can perform the operations illustrated.

Processor 820 may be a central processing unit (CPU) or dedicated hardware/software, such as a PAL, ASIC, FGPA, operable to execute computer instruction code or a combination of code and logical operations. In one embodiment, processor 820 may include code which, when executed by the processor, performs the operations illustrated herein. The code may be contained in memory 830, may be read or downloaded from a tangible memory medium such as a CD-ROM or floppy disk, represented as 883, may be provided by a manual input device 885, such as a keyboard or a keypad entry, or may be read from a magnetic or optical medium (not shown) or via a second I/O device 887 when needed. Information items provided by devices 883, 885, 887 may be accessible to processor 820 through input/output device 840, as shown. Further, the data received by input/output device 840 may be immediately accessible by processor 820 or may be stored in memory 830. Processor 820 may further provide the results of the processing to display 880, recording device 890 or a second processing unit 895.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, microchannel bus, PCI bus, PCMCIA bus, USB, etc., or one or more internal connections of a circuit, circuit card or other device, as well as portions and combinations of these and other communication media, or an external network, e.g., the Internet, an Intranet, a LAN, a WAN, each of which may be wired or wireless. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 810 may also be in two-way communication with each of the devices 805. Processing system 810 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, network 870 may also be internal networks or one or more internal connections of a circuit, circuit card or other device, as well as portions and combinations of these and other communication media that are contained within device 810 or may be an external network, e.g., the Internet and Intranet.

While the device 810 has been described in detail regarding basic components, it would be recognized that devices 805 may has similar basic components, and the operation of devices 805 need not be described in detail again.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

The invention claimed is:

1. A method of managing membership of a device group, the device group comprising a plurality of devices, wherein each device in the device group possesses device keys of all other devices in the device group, except its own device key, the method comprising:
   electing one of the device group members as a group manager device, the group manager device possessing all device keys of the devices in the device group, including its own device key;
   proving, by the group manager, its group manager identity to another device in the device group by encrypting and sending a message using all device keys that the other device possesses,
   and in case of adding a new device to the device group:
   establishing a secure connection between the new device and the group manager device;
   sending, by the group manager device, the device keys of all devices in the device group to the new device;
   generating and distributing, by one of the devices in the device group, a device key of the new device
   to all other devices in the device group,
   and in case of removing a device from the device group:
   generating and distributing, by any combination of devices remaining in the device group, new device keys for the devices remaining in the device group, such that each of the devices other than the group manager device does not generate its own new device key and does not receive its own new device key.

2. The method according to claim 1, wherein the device key of the new device is generated and distributed by the group manager device.

3. The method according to claim 1, further comprising:
   authenticating the new device by the group manager device before sending the device keys of all devices in the device group to the new device.

4. The method according to claim 1, wherein the new device key of each of the devices remaining in the device group is generated randomly.

5. The method according to claim 1, wherein each of the new device keys for each of the devices remaining in the device group are distributed after having been encrypted with the device key of the device being removed from the device group and with the old device key of the each of the devices remaining in the device group.

6. The method according to claim 1, wherein the device to be removed is the group manager device, the method further comprising:
   electing a new group manager device from the devices remaining in the device group.

7. The method according to claim 1, further comprising:
   each device in the device group rekeying device keys each device possesses.

8. The method according to claim 7, wherein the rekeying of the device keys each device possesses is by performing a one-way function on the device keys.

9. A method of managing the membership of a device group, the device group comprises n devices, where n is a number greater than 1, wherein each device in the device group possesses key material with which it can encrypt messages to the whole device group or to any subset of the device group, such that only addressed devices can decrypt the messages under a k-resilient scheme, where k is a number greater than 1, wherein the k-resilient scheme is a scheme that remains secured with up to k member devices being compromised, the method comprising:

electing one of the device group members as a group manager device, the group manager device possessing all device keys of the devices in the device group, including its own device key, such that the group manager device can decrypt the messages under the k-resilient scheme, where k is a number greater than 1;

proving, by the group manager, its group manager identity to another device in the device group by encrypting and sending a message using all device keys that the other device possesses;

and in case of adding a new device to the device group:
generating, by the group manager device, for all subsets of the device group that have at most k-1 members, extended with the new device, thus for subsets of at most k member devices, new key material per subset to encrypt messages that can be decrypted by all devices except the devices in the subset of the device group and except the new device, and distributing the key material per subset to all devices in the device group that are not part of the subset of the device group;

establishing a secure connections between the new device and the group manager device; and sending, by the group manager device, the key material to the new device;

and in case of removing a device from the device group:
generating, by the group manager device, for all subsets of the device group that have at most k members and that do not include the device to be removed from the device group, new key material per subset to encrypt messages that can be decrypted by all devices except devices in said subset of the device group, and distributing said key material per subset to all devices in the device group that are not part of the subset of the device group.

10. The method according to claim 9, further comprising:
in the case of adding a new device to the device group, authenticating the new device by the group manager device before sending the key material to the new device.

11. A device of a device group comprising a plurality of devices, each device in the device group possessing device keys of all other devices in the device group except its own device key, said device comprising:

a processor in communication with a memory, the memory including code, which when accessed by the processor causes the processor to:

elect the device as a group manager device, the group manager device possessing all device keys of the devices in the device group, including its own device key;

prove the device's group manager identity to another device in the device group by encrypting and sending a message using all device keys that the other device possesses, and establish a secure connection with a new device;

send the device keys of all devices in the device group to the new device; and generate and distribute a device key of the new device to all other devices in the device group except the new device.

12. The device according to claim 11, the code further causing the processor to:
rekey device keys within said group manager.

13. The device according to claim 12, wherein the rekeying of the device keys comprises:
performing a one-way function on the device keys.

14. The device according to claim 11, the code further causing the processor to:
authenticate the new device before sending the device keys of all devices in the device group to the new device.

* * * * *